INVENTOR
R. C. HOYLER
BY
Charles Scott Phelan
ATTORNEY

Aug. 5, 1969 R. C. HOYLER 3,459,894

DYNAMIC COMB FILTER

Filed March 3, 1966 2 Sheets-Sheet 2

United States Patent Office 3,459,894
Patented Aug. 5, 1969

3,459,894
DYNAMIC COMB FILTER

Robert C. Hoyler, New Shrewsbury, N.J., assignor to Bell Telephone Laboratories, Incorporated, New York, N.Y., a corporation of New York Filed Mar. 3, 1966, Ser. No. 531,468
Int. Cl. H04m *1/00;* H03k *7/00*
U.S. Cl. 179—1 16 Claims

ABSTRACT OF THE DISCLOSURE

A dynamic comb filter for use as an echo suppressor in four-wire transmission systems includes a frequency spectrum analyzer, sampling means and means for reconstructing the envelope of the signal applied to the analyzer. The frequency spectrum analyzer produces a recurrent frequency analysis of an information signal. The analyzed signal is then sampled by means of a gate and a source of gating pulses, producing a "reduced" version of the information signal from which certain frequency components have been removed. The reduced signal is then demodulated to reconstruct the input signal envelope.

This invention relates to a comb filter. More particularly, the invention relates to a comb filter which operates dynamically on a spectrum scanning principle. The invention is herein described in connection with conference circuits for telephonic communications systems.

Comb filters are known in the art and they are adapted to provide across a frequency spectrum of predetermined bandwidth a plurality of spaced bands of substantially lower attenuation than is provided in the frequency bands between such spaced low attenuation bands. Usually such filters are made of an array of passive impedance elements and include a plurality of resonant devices such as piezoelectric crystals for improving the sharpness of definition of lower attenuation bands of the comb filter. This type of array of elements is employed in echo suppressors in telephonic communication systems by utilizing separate comb filters with complementary pass bands in the two transmission circuits for transmission in opposite directions on a 4-wire transmission line. Thus, the principal frequencies transmitted in one direction through a first one of the comb filters lie in the high attenuation bands of the complementary comb filter so that their transmission as an echo in the opposite direction is substantially suppressed. Passive comb filters of the type just mentioned generally involve rather critical design constructions and are costly to manufacture because of the necessity for providing a relatively large number of complementary pass bands within the bandwidth of a voice signal without at the same time degrading such signal to the point of unintelligibility. Furthermore, there must be no significant overlap of the pass bands of the comb filters for opposite directions of transmission or singing or echo will occur.

It is further known in the signal wave analyzing art to utilize an input signal to amplitude modulate a frequency modulated oscillation wave and then pass the output of the amplitude modulator through a bandpass filter. The filter output constitutes a signal wave representing a continuous scan of the input signal spectrum which is useful for analytical purposes but from which information cannot be detected by the same type of circuits that would be used to detect information from the original input signal.

It is, therefore, an object of the present invention to improve comb filters.

It is another object to reduce the cost of comb filters.

A further object is to facilitate the design of comb filters.

These and other objects of the invention are realized in an illustrative embodiment in which an input signal has an unpredictably varying signal envelope and a predetermined frequency band of interest. The spectrum of that band is recurrently analyzed. An output signal representing the recurrent analysis is sampled and the samples are utilized to reconstitute a signal envelope corresponding to the original input signal envelope.

In one embodiment of the invention the recurrent analysis is accomplished by utilizing the input signal to amplitude modulate a frequency modulated oscillation wave and then coupling the double modulated signal to a bandpass filter that is tuned to the highest frequency of the frequency modulated oscillations. The output of the bandpass filter is sampled at a rate which is much higher than the highest frequency in the band of interest in the aforementioned input signal, and the resulting samples are demodulated in response to the same frequency modulated oscillation wave for thereby forming a comb of segments of the input signal spectrum.

It is one feature of the invention that two dynamic comb filters of the type described are connected in the transmit and receive circuits, respectively, of a 4-wire transmission line and these two filters have complementary comb pass bands for attenuating in one of those two circuits any signals coupled from the other thereof regardless of the time delay of such coupling.

It is another feature of the invention that in each dynamic comb filter the bandpass filter thereof comprises a negative feedback amplifier with a resonant crystal in the feedback circuit for disabling such feedback in response to the amplification of signals at the resonant frequency of the crystal.

It is a further feature of the invention that the use of dynamic comb filters in 4-wire transmission lines in a conference circuit, wherein hybrid coupling devices are provided for coupling at least one of such lines to a 2-wire bidirectional transmission line, attenuates the echo coupling through such hybrid connection and within the conference circuit of a signal transmitted from a different branch of the conference circuit.

Yet another feature of the invention is that dynamic comb filters in a plurality of branches of a conference circuit are operated by a single frequency modulated oscillation source.

An additional feature is that the combination of sampling, modulation, and bandpass filtering techniques substantially eliminates problems of possibly overlapping pass bands of complementary filters in a signal system where singing or echo could otherwise occur.

Still another feature of the invention is that the utilization of dynamic comb filters makes it both possible and economically convenient to couple a plurality of bidirectional 2-wire lines to a telephone conference circuit adapted for 4-wire transmission lines.

A more complete understanding of this invention and the features and objects thereof may be obtained from a consideration of the following detailed description in connection with the appended claims and the attached drawing in which:

Figure 1:
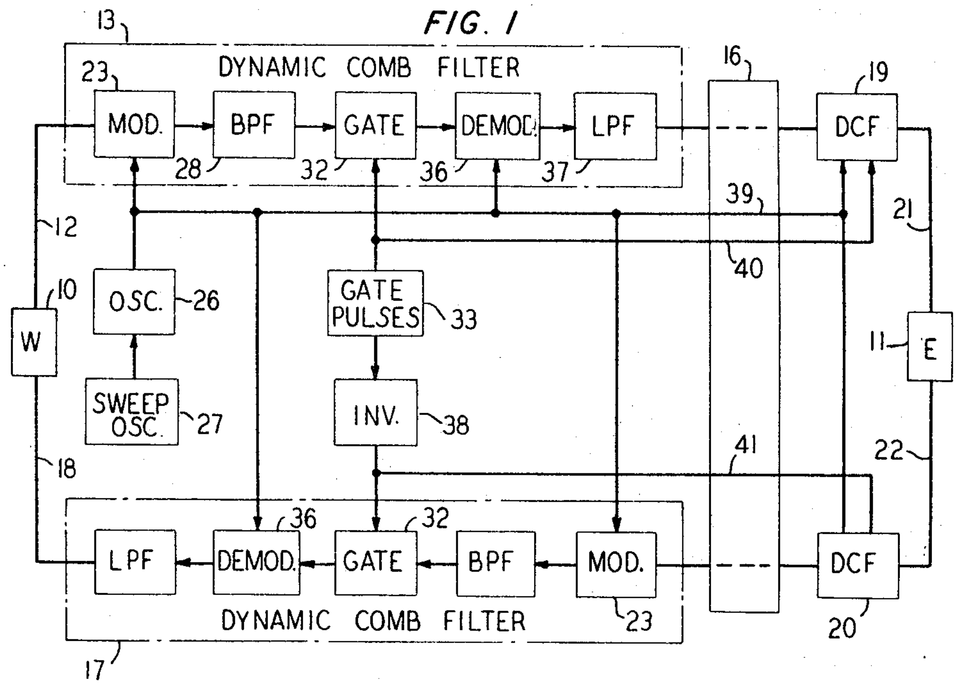
FIG. 1 is a block and line diagram of a transmission system utilizing dynamic comb filters in accordance with the invention.
Figure 3:
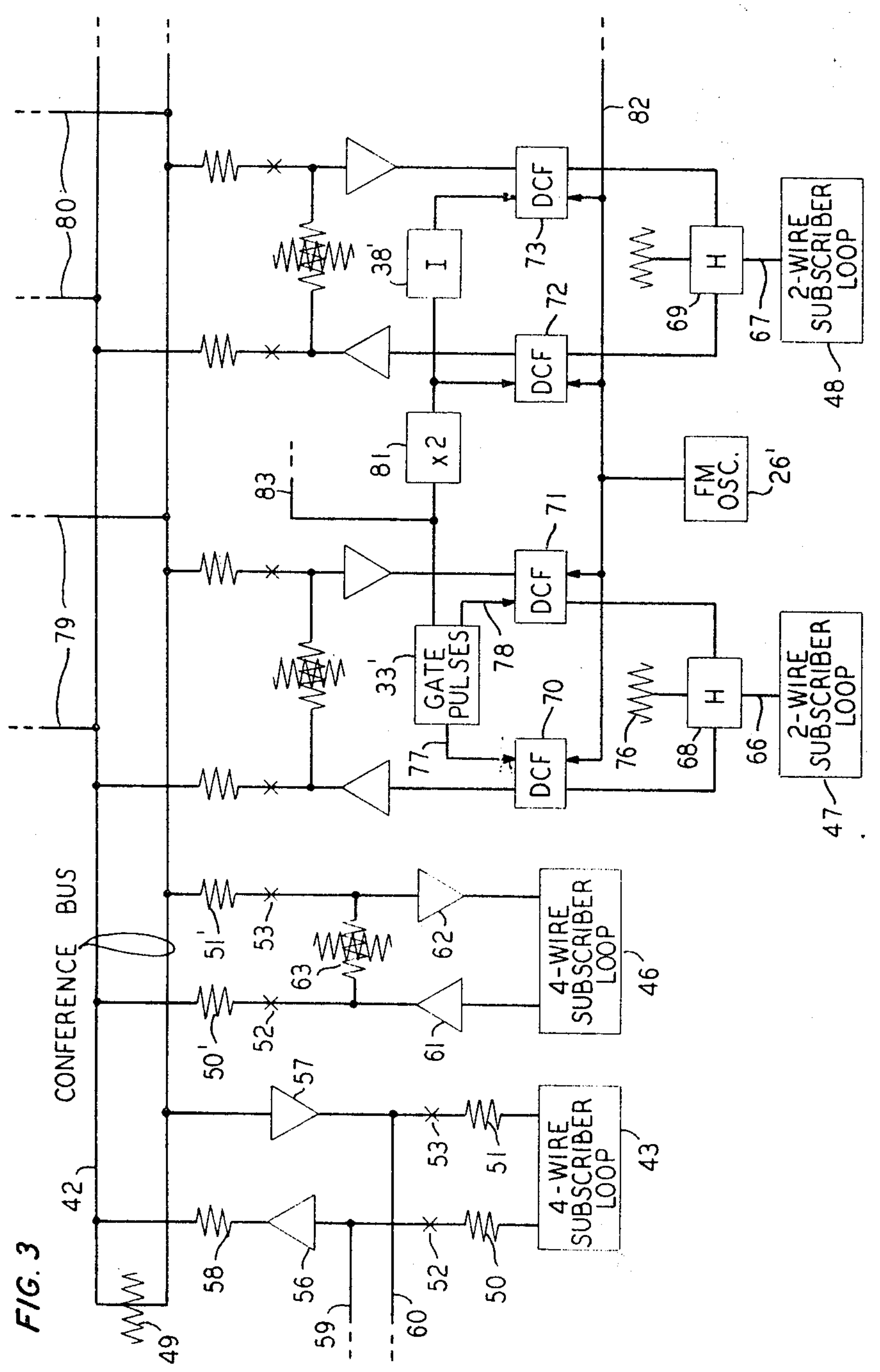
FIG. 3 is a block and line diagram illustrating a modified form of the invention.

The invention is shown in FIGS. 1 and 3 in the form of block and line diagrams only since all of the individual blocks making up the over-all circuit are well known in the art. In FIG. 1 there is shown a simplified arrangement utilizing comb filters in transmission circuits linking a west transmission station 10 and an east transmission station 11. Each of these stations has capability for both transmitting and receiving information signals. Although a 4-wire transmission line is shown for coupling the stations 10 and 11 together, it is to be understood that each such station may, in accordance with well known transmission techniques, include a bidirectional 2-wire transmission circuit that is coupled through a hybrid coupling network to the 4-wire transmission line that is shown in the drawing.

Station 10 couples information signals to a 2-wire circuit schematically represented by the lead 12, and a dynamic comb filter 13 in accordance with the invention couples the 2-wire circuit 12 to corresponding circuitry in any suitable transmission system 16. The latter transmission system may include, for example, a telephone central office with telephone conference circuit facilities for interconnecting a large number of subscribers with one another simultaneously. Station 10 similarly receives information signals from the transmission system 16 by way of another dynamic comb filter 17 and a 2-wire transmission circuit 18. The transmit circuit 12 and receive circuit 18 comprise the subscriber loop for the station 10, and the communication network represented thereby extends from the transmission system 16 to another similar subscriber loop including dynamic comb filters 19 and 20 in the receive circuit 21 and the transmit circuit 22, respectively, of the station 11.

The dynamic comb filters serve the principal function of comb filters which is known in the art as taught, for example, in the C. C. Cutler Patent 3,175,051. In accordance with this function the comb filters prevent information signal looping between transmit and receive circuits of a subscriber's loop circuit which may cause such loop circuit to sing and which may at least produce an annoying echo. This function is achieved, as has been hereinbefore noted, by designing the comb filters for the transmit and receive portions of the subscriber loop to have a plurality of complementary spaced pass bands so that any signal normally transmitted through one side of such a 4-wire subscriber loop circuit includes a number of frequency components which lie in the intermediate attenuation bands of the complementary comb filter on the other side of such loop circuit.

The dynamic comb filters of the present invention each include a modulator 23 which receives information signals, for example, from the 2-wire circuit 12. Such signals have an unpredictable envelope and a useful frequency band of predetermined width as is well known in the art. A recurrent spectrum analysis of the band is accomplished by employing the signals to amplitude modulate frequency modulated oscillations that are provided to the modulator 23 from an oscillator 26. The oscillator is frequency modulated in accordance with the voltage output of a sweep oscillator 27. All output frequencies from oscillator 26 are advantageously much higher than any of the frequencies in the voice band of interest in the signal supplied by circuit 12 from station 10. Likewise the sweep rate of the oscillator 27 is also much higher than any frequency of interest in the voice band signal supplied by station 10, but the sweep rate of oscillator 27 is much lower than the output frequencies of oscillator 26. The range of frequency sweep controlled by the oscillator 27 is at least equal to the width of the voice band of interest in the signals supplied from station 10. For example, oscillator 26 operates at a nominal frequency of four megacycles, and it is frequency modulated through a range of $\pm 2$ kilocycles per second at a rate of 8 kilocycles per second by the oscillator 27.

Sweep oscillator 27 may be of any type known in the art and advantageously provides a sawtooth voltage wave which is utilized for controlling the frequency of oscillator 26. Oscillator 27 may also be advantageously designed so that its output sawtooth wave has a concave voltage rise portion preceding each flyback portion of the wave in order to sweep the frequency of oscillator 26 through the lower part of its range of modulation at a slower rate than the upper part. It will be seen from subsequent description of the invention that this modification will cause the invention to produce comb filter bands which are in the lower portion of the range narrower and more closely spaced than those in the upper portion of the band. This type of band assignments within the sweep range improves the intelligibility of output signals from a comb filter structure as is known in the art and described, for example, in the aforementioned Cutler patent.

Figure 1A:
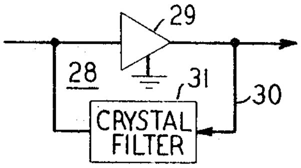
FIG. 1A is a simplified block and line diagram of a bandpass filter utilized in the invention.

The frequency and amplitude modulated output of modulator 23 is coupled to a bandpass filter 28 which is tuned to the highest frequency in the sweep range of oscillator 26. This filter has a narrow pass band spectrum envelope with steep sides. A narrow pass band is advantageously produced by a circuit of the type illustrated in FIG. 1A. This bandpass filter comprises an amplifier 29 with a negative feedback circuit 30 which has a crystal null filter 31 connected therein. The crystal filter is adapted to disable the feedback circuit 30 so that amplifier 29 provides its full open loop gain in the band of interest for the filter 31, which is also the pass band of bandpass filter 28. The circuit of FIG. 1A has the capability of readily realizing an effective Q of the order of $25\times10^5$ by using an amplifier 29 with an open loop gain of about 100 and a crystal null filter with a Q of $25\times10^3$. Crystal filters can be conveniently designed by well known filter design techniques to produce an over-all effective Q of the indicated magnitude when combined with an amplifier of corresponding gain. The over-all bandpass filter can thus be designed to have a very narrow pass band in the null frequency range of the crystal in filter 31. As previously indicated, this pass band is in the megacycle range of the frequency spectrum, and consequently crystal overtones do not generally appear in any of the frequency bands of interest.

The output of bandpass filter 28 includes a continuous signal which is representative of the spectrum analysis of the input voice signal from station 10 displaced to the megacycle frequency range but no intelligible information of significance is included in this form of the signal which is provided by the filter in the sense that a different type of detection equipment would be required at the filter output than would be required at the output of station 10. However, such signals are applied to a gate circuit 32 of any known type which is recurrently enabled by gate pulses provided by a gate pulse source 33. Each time that the gate 32 is thus enabled a sample of the output signal from filter 28 is coupled to a demodulator 36 which is responsive to the frequency modulated oscillations from oscillator 26 for extracting the amplitude modulated information from the gate 32 signal samples. The gate pulses provided by source 33 are advantageously at a frequency of 400 kilocycles per second, which is much greater than any of the original voice band signal frequencies and also much greater than the sweep rate provided by oscillator 27 and the sweep range in the output of oscillator 26. However, the repetition rate of the pulses from source 33 is substantially less than the nominal operating frequency of the oscillator 26.

The frequency, width, and spacing of pulses from source 33 and the rate and band over which the output of oscillator 26 is swept determine the portion of the spectrum of the double modulated signal that is sampled by any one gate pulse. The width of the pass band of filter 28 must, of course, be narrow enough so that its effective extremities do not overlap spectrum portions sampled by two successive gate pulses.

At the indicated gate pulse rate of 400 kilocycles per second the output signal of filter 28 is sampled fifty times during each sweep cycle of the 8 kilocycle sweep rate of oscillator 27. Each of those fifty samples covers a different narrow band of the spectrum of the modulating voice signal, and all of such sample bands are spaced from one another across such spectrum. Thus, the comb spectrum characteristic of the filter 13 is formed. The number, width, and spacing of the narrow bands in the comb spectrum of the filter 13 are functions of the sweep rate of oscillator 26, the output pulse rate of source 33, and the configuration of the sweep control signals supplied by the oscillator 27 to the oscillator 26.

Demodulator 36 receives the signal samples from gate 32 and restores them to the voice band, as previously indicated, in response to the frequency modulated oscillations from oscillator 26. Output signals from demodulator 36 are coupled through a low-pass filter 37 to the transmission system 16. Reconstituted signals in the output of filter 37 have an envelope corresponding to the envelope of signals supplied by station 10 in that the same information is detectable therein by the same type of detection equipment. Filter 37 blocks high frequency components in the output of demodulator 36 and smooths the demodulated signal samples prior to transmission thereof to the receiving station 11, as previously described. Demodulator 36 and modulator 23 may be of any suitable known type of amplitude modulation circuits such as the well known balanced modulators which are conveniently utilized for either modulation or demodulation in accordance with the manner in which input signals are applied and output signals are derived, all as is known in the art.

The subscriber loop for the subscriber station 10 includes the two dynamic comb filters 13 and 17, as previously noted. The filter 17 is of the same type as filter 13 but reversed so that its modulator 23 receives as input signals the signals which are transmitted by subscriber station 11 through its circuit 22, filter 20, and the transmission system 16. The gate 32 in filter 17 receives the output of gate pulse source 33 by way of an inverting circuit 38 so that it actually receives a pulse train waveform which is the complement of that applied by the source 33 directly to the gate 32 in filter 13. Consequently, the gates 32 in the two filters 13 and 17 are synchronized through source 33 to be alternately enabled.

The modulator 23 and demodulator 36 in filter 17 receive the same frequency modulated oscillation wave from oscillator 26 which is also applied to corresponding elements in the filter 13. Consequently, the gate 32 in filter 17 couples to the corresponding demodulator 36 therein spectrum samples which are between the samples utilized in filter 13 in the over-all spectrum of modulated signals. Thus the comb spectrum of filter 17 is a complement of the comb spectrum of filter 13 because it attenuates in bands where filter 13 provides low attenuation transmission and it provides low attenuation in bands where filter 13 provides high attenuation transmission. Consequently, the two comb filters 13 and 17 cooperate to inhibit the looping in the subscriber loop of any echo signal in one side of the circuit of a normal signal from the other side of the circuit. For example, as previously noted, a hybrid connection (not shown) in the station 10 may couple a received signal from the circuit 18 in delayed and somewhat attenuated form to the transmit circuit 12 of the subscriber loop. However, the complementary comb characteristic of the filter 13 prevents such echo which appears in the circuit 12 from being coupled to the transmission system 16 and back to the station 11. Similarly, the receiving dynamic comb filter 17 prevents the return to station 10 from transmission system 16 of any echo of a signal originating in the transmission circuit 12 of the subscriber loop.

In the subscriber loop of station 11, the dynamic comb filters 19 and 20 perform in the same manner as do the filters 13 and 17 in the subscriber loop of the station 10. Filters 19 and 20 receive the frequency modulated oscillations from oscillator 26 by way of a circuit 39 so that they are forced to operate in synchronism with filters 13 and 17. For the same reason, the receive filter 19 receives by way of a circuit 40 the same gate pulse waveform as does the transmit filter 13; and, similary, the transmit filter 20 receives on a circuit 41 the same inverted gate pulses which are utilized by the receive filter 17.

All of the dynamic comb filters would normally be located in peripheral equipment of any central office included in the transmission system 16 although they are not so shown in FIG. 1. Consequently, the synchronizing connections provided by the circuits 39, 40, and 41 do not require extensive transmission channels in the portions of the system 16 which link geographically remote locations such as the locations of the subscriber stations 10 and 11. The application of the gate pulses on circuit 40 to the receiving dynamic comb filter 19 in the loop of station 11 causes the gate 32 therein to be enabled simultaneously with the corresponding gate of the filter 13. Similarly, the gate 32 of the transmit filter 20 is simultaneously operated with the corresponding gate of receive filter 17 so that the stations 10 and 11 can readily communicate with one another.

The circuit of FIG. 1 corresponds to a simplified conference circuit in which only two conference branches are interconnected, i.e., the branches corresponding to the respective subscriber loops of stations 10 and 11. A more typical and more complex conference circuit situation is illustrated in FIG. 3 and utilizes a plurality of conference branch circuit pairs that are controlled by gate pulses from the gate pulse source 33' in a manner illustrated by the timing diagrams in FIGS. 2A through 2D as will be subsequently described. In FIG. 3 a conference bus 42 interconnects for communication a plurality of subscriber loop circuits. Only four such circuits 43, 46, 47, and 48 are shown. However, many more subscriber circuits can easily be included for intercommunication by way of the bus 42. The bus is schematically illustrated in the form of a single wire loop, but it is advantageously a 2-wire bidirectional loop circuit with a shunt impedance, schematically represented by a resistor 49, connected thereacross to give the bus an appropriate terminating impedance for matching the impedances of the various conference branch circuits which are coupled thereto. In FIG. 3, it will be noted that in some cases circuit portions, e.g., comb filters, which were indicated in FIG. 1 to be included in a subscriber loop circuit are actually separately shown in FIG. 3 as part of individual conference branch circuits. This variation in mode of description facilitates description and is not foreign to terminology actually employed in the art.

Each of the subscriber loops shown in FIG. 3 is coupled to the conference bus 42 by a link including a 4-wire transmission line having a 2-wire transmit circuit and a 2-wire receive circuit. The 4-wire subscriber loop 43 represents a typical local loop circuit of relatively small delay wherein echo effects are not generally troublesome insofar as the subscriber is concerned. The loop 43 is coupled by impedance padding resistors 50 and 51 in its transmit and receive circuits, respectively, to crosspoint connections schematically represented by the X's 52 and 53. Such crosspoint connections represent schematically switching facilities not otherwise shown for selectively connecting individual subscriber loops to the conference bus 42. The conference branch circuit for the local loops includes a transmit amplifier 56 for such loops and a receive amplifier 57 for such loops. A further padding resistor 58 is included in the output of amplifier 56.

For convenience of schematic representation in FIG. 3, the transmit sides of all conference branch circuits are connected to the upper portion of conference bus 42 and the receive sides of all conference branch circuits are connected to the lower portion of conference bus 42. In actual practice there is no electrical difference between such two portions since the entire bus 42 is a 2-wire bus circuit. Leads 59 and 60 schematically represent plural additional 4-wire transmission lines connected in multiple to the amplifiers 56 and 57 for connecting plural additional local subscriber loops of the same type as the loop 43 into the conference system.

The 4-wire subscriber loop 46 in FIG. 3 represents a subscriber which is sufficiently remote from the conference system to require some echo suppressing techniques for his benefit. The loop 46 is coupled to the bus 43 through transmit and receive amplifiers 61 and 62, respectively, as well as additional crosspoints 52 and 53 and impedance padding resistors 50′ and 51′. All of the other conference branch circuits to be hereinafter described also include similar crosspoints and padding resistances.

The conference branch circuit for subscriber loop 46 also includes an impedance network 63 coupled between the output of amplifier 61 and the input of amplifier 62. This network is adapted in a manner which is known in the art to couple a portion of the transmitted signal from the output of amplifier 61 to the input of the amplifier 62 in phase opposition with respect to any portion of such transmitted signal which may also reach the input of amplifier 62 through the padding resistor 50′, conference bus 42 and padding resistor 51′. This provides a convenient arrangement for suppressing echoes which would otherwise disturb the subscriber, and similar arrangements are provided in the remaining conference branch circuits not yet described, together with their corresponding transmit and receive amplifiers. However, this type of echo suppressing is not capable of providing adequate protection for other types of echoes that appear, for example, as the result of the connection for additional 4-wire conference branch circuits to 2-wire bidirectional subscriber circuits as will be subsequently described.

Two-wire subscriber loops 47 and 48 are coupled through bidirectional 2-wire circuits 66 and 67 to corresponding input ports of hybrid coupling networks 68 and 69, respectively. The latter networks couple the 2-wire bidirectional circuits to 4-wire conference branch circuits of the type previously described for the subscriber loop 46, but such coupling from the hybrid networks is accomplished by way of dynamic comb filters 70 through 73, in accordance with the present invention. The dynamic comb filters protect the conference network with respect to echo signals that result as a consequence of imperfect conjucacy of any of the hybrid networks 68 and 69.

With respect to the network 68, it is known that signals transmitted from the loop 47 to that network are coupled partly to the input of the transmit comb filter 70 and partly to a terminating impedance 76 of the hybrid network. Similarly, signals provided by the receiving comb filter 71 are coupled through the hybrid network to the bidirectional 2-wire circuit 66 and also in part through such network to the transmitting filter 70. The imperfect conjucacy which the output of filter 71 to reach the input of filter 70 would, without the presence of the comb filters, permit a signal to be coupled from the transmitting amplifier 61 through conference bus 42, comb filter 71, hybrid network 68, comb filter 70, conference bus 42 once more, and receiving amplifier 62. This rather complex signal looping path has such uncertainties that it is not convenient to provide an echo cancelling impedance network such as the network 63 for this particular echo effect. However, the dynamic comb filters eliminate such echo effect in a relatively inexpensive fashion and without dependence upon any particular phase relationship between an originating signal and an echo signal resulting therefrom.

The conference branch circuit of the 2-wire subscriber loop 47 in FIG. 3 corresponds to the subscriber loop of station 10 with its filters 13 and 17 in FIG. 1. In FIG. 3 a source 33′ of gate pulses supplies such pulses directly on a circuit 77 to the dynamic comb filter 70 and in inverted form on a circuit 78 to the comb filter 71. A source 26′ of frequency modulated oscillations corresponds to the two oscillators 26 and 27 in FIG. 1 and supplies such oscillations to the dynamic comb filters 70 and 71 in FIG. 3. An unconnected lead pair 79 schematically represents an additional branch conference circuit coupled to conference bus 42 and of the same type as the branch circuit and subscriber loop 47. The branch conference circuit 79 is related to the subscriber loop 47 in the same fashion that the circuits of stations 10 and 11 are related in FIG. 1 in that the circuits of the branch 79 receive frequency modulated oscillations from source 26′ and the dynamic comb filters of the branch circuit 79 receive the two complementary gate pulse trains from circuits 77 and 78 to enable direct communication between subscriber loop 47 and the corresponding conference branch circuit 79. The branch 79 and the branch circuit of subscriber loop 47 comprise a conference branch circuit pair.

Subscriber loop 48 and its conference branch circuit, and an additional similar branch circuit and subscriber loop schematically represented by a lead pair 80, comprise a second conference branch circuit pair. The last-mentioned pair cooperates with the first-mentioned conference branch circuit pair to permit conference communication among the four 2-wire subscriber loops of the two indicated conference branch circuit pairs and communication of any of them with any other subscribers whose loop circuits are also coupled to the conference bus 42. Dynamic comb filters 72 and 73 for the 2-wire subscriber loop 48 receive frequency modulated oscillations from the source 26′ for controlling the operations of the modulators and demodulators therein. Similarly, a frequency multiplying circuit 81 supplies gate pulses from the source 33′ with their frequency multiplied by a factor of two for controlling the operation of the gates 32 in comb filters 72 and 73. These double frequency gate pulses are applied directly from the multiplying circuit 81 to filter 72 and an inverter 38′ provides the complementary pulse waveform to comb filter 73. In like manner the dynamic comb filters of branch circuit 80 receive the same gate pulses and frequency modulated oscillations supplied to filters 72 and 73.

Comb filters 72 and 73, and their counterparts in branch 80, operate in the same fashion as the corresponding filters in FIG. 1 and in the branch circuit of subscriber loop 47, but the filter gates are operated at twice the frequency of any of those other comb filters. Thus, all subscribers on 2-wire subscriber loops can receive intelligibly any transmission from any other such loop or from any other conference circuit party. In a similar fashion a lead 82 supplies frequency modulated oscillations from source 26′ to other conference branch circuit pairs to control their comb filter modulators and demodulators. Also a lead 83 supplies pulses from the gate pulse source 33′ through other frequency multipliers (not shown) to such additional conference branch circuit pairs (not shown) for controlling the operation of their comb filter gating means at a different frequency for each such conference branch circuit pair. The gate control pulses thus supplied to comb filters of any branch or conference branch circuit pair differ in frequency from those supplied to any other conference branch circuit pair by a factor of at least two, as indicated in the timing diagrams of FIGS. 2A through 2D.

Figure 2A:
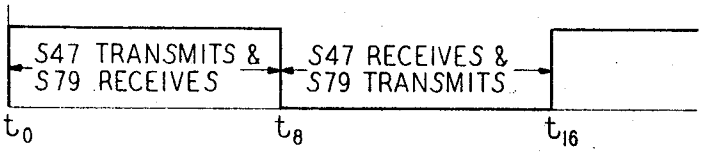
FIGS. 2A through 2D are timing diagrams illustrating the operation of an embodiment of the invention.

The diagrams of FIGS. 2A through 2D represent gate timing for four conference branch circuit pairs, i.e., conference branch circuits accommodating eight bidirectional 2-wire subscriber loop circuits. FIG. 2A represents the gate operation controlled by pulses supplied directly without multiplication from the gate pulse source 33′ in FIG. 3; and the pulse wave has a frequency of, for example, 200 kilocycles per second. Thus, each positive-going pulse in the FIG. 2A represents the enabled conditions for the gate in transmitting filter 70 and the gate in the corresponding receiving filter of the branch circuit 79. The complement, not shown, of the diagram in FIG. 2A would include positive-going portions representing the operation of gates in the receiving comb filter 71 and the corresponding transmitting comb filter in branch 79. In FIG. 2A the gate in filter 70 of FIG. 3 is enabled between the times $t_0$ and $t_8$ and the gate in filter 71 is enabled between times $t_8$ and $t_{16}$.

Figure 2B:
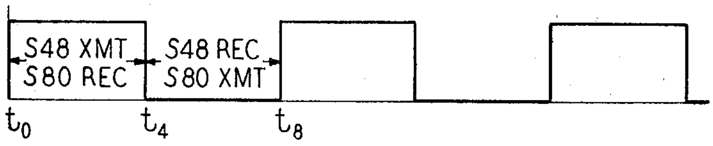
Figure 2C:
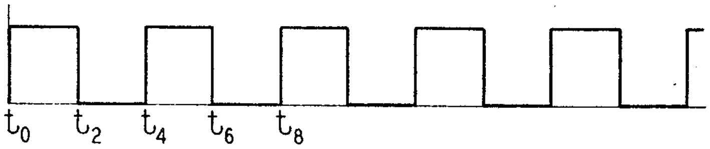

FIG. 2B illustrates the similar timing for the conference branch circuit pair including subscriber loop 48 which receives double-frequency control pulses from the multiplier circuit 81. Such pulses enable the gates 32 in transmitting filter 72 and the corresponding gates in the receiving filter in branch circuit 80 between the times $t_0$ and $t_4$ in FIG. 2B. Similarly, multiplied gate pulses operate comb filter gates in additional conference branch circuit pairs, not shown, in accordance with the timing diagrams of FIGS. 2C and 2D, the latter figure representing a gate pulse frequency of 1.6 megacycles per second.

Figure 2D:
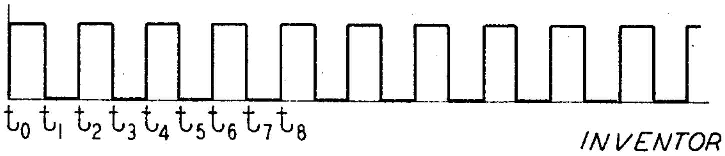

The manner in which various subscribers are interconnected can be seen by reference to FIGS. 2A–2D wherein all frequencies shown are in excess of the Nyquist rate for the frequency of modulation of the output of oscillator 26'. If a subscriber in one of the conference branch circuit pairs, not shown but receiving gate pulses in accordance with FIG. 2D, is transmitting to the conference bus 42 during the time interval $t_0$–$t_8$, his signals will actually appear on the bus at times $t_0$–$t_1$, $t_2$–$t_3$, et cetera when his transmitting filter gate is enabled. The other subscriber of his branch circuit pair will hear from him at the same times. Those signals will be heard in the subscriber loop 48 at the times $t_4$–$t_5$ and $t_6$–$t_7$ when the gate in receiving filter 73 and the gate in the transmitting filter of the sending subscriber are simultaneously enabled. Similarly, between times $t_0$–$t_1$ and $t_2$–$t_3$ the same sending subscriber will be heard by the subscriber in branch circuit 80. In addition at times $t_0$–$t_1$ and $t_4$–$t_5$ and at times $t_3$–$t_4$ and $t_7$–$t_8$ the same sending subscriber will be heard by the subscribers in the two branches of the other branch conference circuit pair not shown as can be understood by comparing FIGS. 2C and 2D. The same sending subscriber will be heard in the branch circuit 79 during the intervals $t_0$–$t_1$, $t_2$–$t_3$, $t_4$–$t_5$, and $t_6$–$t_7$ as can be seen by comparing FIGS. 2A and 2D; but he will not be heard at all in subscriber loop 47 unless he is continuing to transmit between the times $t_8$–$t_{16}$ when the gate in receiving filter 71 is enabled as indicated in FIG. 2A. However, this latter condition does not produce any difficulties of intelligibility since the gate pulse rate in FIG. 2A is 200 kilocycles per second, a frequency which is much higher than any frequency in the voice band of interest and it is also much higher than the frequency modulation sweep rate represented by oscillations from source 26'.

In summary, the dynamic comb filters of the invention suppress signal looping in circuit environments which would otherwise permit such action. The use of these comb filters is flexibly controlled to accommodate cooperation of a plurality of circuits in telephone conference systems. Such cooperation is conveniently achieved because filters of the invention operate on modulation and time gating principles and are, therefore, not troubled by conference administrative problems such as the exercise of control by the loudest talker, details of signal and echo phase consideration, and the inability to transmit duplex data which is a substantial difficulty for some types of prior art echo suppression systems.

Although the present invention has been described in connection with particular embodiments and applications thereof, it is to be understood that modifications which will be apparent to those skilled in the art are included within the spirit and scope of the invention.

What is claimed is:

1. In combination,
   a source of input signals having an unpredictably varying envelope and a useful frequency band of predetermined width,
   means responsive to said signals and producing an output signal comprising a recurrent frequency spectrum analysis of said band,
   means sampling said output signal, and
   means responsive to an output of said sampling means reconstituting a signal envelope corresponding to said input signal envelope.

2. The combination in accordance with claim 1 in which
   said producing means includes means determining the rate of recurrence of said analysis to maintain a rate which is much higher than the highest frequency of said band, and
   said sampling means includes means fixing the rate of operation thereof to be much higher than the rate of recurrence of said analysis.

3. The combination in accordance with claim 1 in which said producing means comprises
   means supplying frequency modulated oscillations,
   an amplitude modulator receiving both said signals and said oscillations, and
   a bandpass filter coupled to an output of said modulator and tuned to the highest frequency of said oscillations.

4. The combination in accordance with claim 3 in which said reconstituting means comprises
   an amplitude demodulator receiving said oscillations for demodulating said signals in the output of said filter.

5. The combination in accordance with claim 3 in which said bandpass filter comprises
   a negative feedback amplifier having a crystal null filter in the feedback circuit thereof for substantially disabling the negative feedback of said amplifier at the null frequency of said filter.

6. The combination in accordance with claim 5 in which the pass band of said bandpass filter is proportioned with respect to the rate and bandwidth of frequency modulation of said oscillations and the rate of operation of said sampling means so that said pass band is less than the width of the band through which said oscillations are swept during a period of operation of said sampling means.

7. The combination in accordance with claim 3 in which said means supplying frequency modulated oscillations comprises
   an oscillator operable at frequencies much higher than the highest frequency of said input signal band,
   means coupling the output of said oscillator to said modulator, and
   means modulating the frequency of said oscillator through a range which is at least equal to the said predetermined width of said band and at a rate which is much larger than the highest frequency of said input signal band.

8. The combination in accordance with claim 7 in which said sampling means includes
   means coupling samples of an output of said filter to said reconstituting means at a rate which is higher than the rate of operation of said frequency modulating means but less than the frequency of operation of said oscillator.

9. The combination in accordance with claim 1 in which
   said producing, sampling, and reconstituting means comprise a first dynamic comb filter,
   a first and a second electric circuit are provided for transmitting signals in opposite directions, respectively,
   said first circuit couples said source to said producing means,
   a second source of input signals is provided, a second dynamic comb filter of the same type as said first filter couples said second source to said second circuit, and means synchronize the operation of said sampling means in each of said filters to cause them to sample their respective producing means in alternate time slots respectively.

10. The combination in accordance with claim 9 in which said first and second circuits and said first and second filters comprise a first 4-wire transmission line, a further 4-wire transmission line similar to said first 4-wire transmission line is provided, each of said 4-wire transmission lines is adapted for transmission of signals in said first circuit thereof and the reception of signals in said second circuit thereof, and said synchronizing means actuates said sampling means in all four of said circuits at the same rate and operates said sampling means in said first and second circuit of said further 4-wire transmission line in the same time slots as said sampling means of said second and first circuits, respectively, of the first-mentioned 4-wire transmission line.

11. The combination in accordance with claim 9 in which hybrid coupling means are provided, and said second source comprises a bidirectional 2-wire transmission circuit coupled through said hybrid coupling means to said first and second circuits, said hybrid coupling means coupling signals from said first circuit to said 2-wire bidirectional circuit with substantially less attenuation than to said second circuit and coupling signals from said bidirectional circuit to said second circuit with substantially less attenuation than to said first circuit.

12. The combination in accordance with claim 9 in which said synchronizing means comprises means supplying two trains of sampling signals in complementary form with respect to one another and at a frequency which is higher than the rate of recurrence of said analysis, and means coupling each of said sampling signal trains to different ones of said sampling means in said first and second filters.

13. The combination in accordance with claim 9 in which said first and second circuits and said first and second filters comprise a first 4-wire transmission line, a plurality of additional 4-wire transmission lines similar to said first line are provided, and a bus circuit is provided to which all of said transmission lines are coupled for simultaneous intercommunication among at least two of such lines.

14. The combination in accordance with claim 13 in which a hybrid coupling circuit has one input connection and an output connection thereof coupled to said first and second circuits, respectively, of one of said 4-wire transmission lines, a bidirectional 2-wire circuit is connected to a bidirectional input of said hybrid coupling circuit, and said hybrid coupling circuit provides signal coupling between said first and second circuits of said one 4-wire transmission line to a lesser degree than between said bidirectional circuit and either of said first and second circuits of said one 4-wire transmission line.

15. The combination in accordance with claim 13 in which said producing means and said reconstituting means in all of said filters are operated in synchronism and at the same rate, said synchronizing means includes means providing for said sampling means of said filters of each of said 4-wire transmission lines a different pair of complementary pulse trains for operating such sampling means in alternation, said 4-wire transmission lines being arranged in pairs of lines, and said providing means supplies pulse trains of a single frequency to said filters of any one of said pairs of lines.

16. The combination in accordance with claim 15 in which said single frequency for any one pair of said 4-wire transmission lines is different from the single frequency of any other one of said transmission line pairs, and the frequency of each set of pulse train pairs is much higher than the frequency of recurrence of said spectrum analysis.

References Cited

UNITED STATES PATENTS

| | | | |
|---|---|---|---|
| 2,729,698 | 1/1956 | Frendendall. | |
| 2,996,667 | 8/1961 | Galbreath | 324—77 |
| 3,020,399 | 2/1962 | Hollis | 325—30 |
| 3,021,478 | 2/1962 | Meacham | 324—77 |
| 3,026,475 | 3/1962 | Applebaum. | |
| 3,175,051 | 3/1965 | Cutler | 179—170.2 |

KATHLEEN H. CLAFFY, Primary Examiner

C. W. JIRAUCH, Assistant Examiner

U.S. Cl. X.R.

333—70